United States Patent [19]
Lemmons

[11] Patent Number: 5,357,882
[45] Date of Patent: Oct. 25, 1994

[54] SUGAR CANE PLANTER

[76] Inventor: C. Harold Lemmons, R.R. 1 Box 325, Raymondville, Tex. 78580

[21] Appl. No.: 21,545

[22] Filed: Feb. 24, 1993

[51] Int. Cl.⁵ ............................................. A01C 7/00
[52] U.S. Cl. ..................................... 111/111; 111/907
[58] Field of Search ............... 111/907, 104, 111, 906, 111/925; 414/519, 525.1, 679, 498

[56] References Cited

U.S. PATENT DOCUMENTS

| | | |
|---|---|---|
| 1,726,139 | 8/1929 | Blasco et al. |
| 3,635,359 | 1/1972 | Fisher ................................ 414/525.1 |
| 3,791,321 | 2/1974 | Tsutsumi ............................. 111/104 |
| 3,921,547 | 11/1975 | Etwell ................................. 111/104 |
| 3,943,862 | 3/1976 | Populin et al. ...................... 111/907 |
| 4,067,466 | 1/1978 | Parks et al. ......................... 414/519 |
| 4,204,491 | 5/1980 | Quick ................................. 111/907 |
| 4,266,490 | 5/1981 | Haines et al. ....................... 111/907 |
| 4,314,514 | 2/1982 | Binder ................................ 111/3 |
| 4,409,903 | 10/1983 | Wilholmson et al. ............. 414/525.1 |
| 4,530,293 | 7/1985 | Stiff et al. .......................... 111/2 |
| 4,634,336 | 1/1987 | Pearce ................................ 414/679 |
| 4,653,411 | 3/1987 | Davis, Sr. ........................... 111/3 |
| 4,696,241 | 9/1987 | Morellini ............................ 111/3 |
| 4,841,883 | 6/1989 | Kukovich, Jr. ..................... 108/137 |
| 5,161,935 | 11/1992 | Pelz et al. ........................... 414/679 |

Primary Examiner—Randolph A. Reese
Assistant Examiner—Spencer Warnick
Attorney, Agent, or Firm—Jacobson, Price, Holman & Stern

[57] ABSTRACT

A transversely elongated planter is provided for connection with and elevated support from the lift hitch mechanism of a heavy duty farm tractor and includes a large volume sugar cane billet storage bin (approximately 10,000 pound capacity) shiftable between front and rear transport and planting positions, respectively. Planter bin has variably openable access openings in the front wall of the bin forward of which rearward facing work persons are seated when the bin is in the rearward planting position and each workmen seat is supported immediately above and to the front of a downwardly tapering chute for receiving sugar cane billets, the lower ends of the chutes being preceded and followed by furrow opening and furrow closing structure, respectively.

19 Claims, 4 Drawing Sheets

SUGAR CANE PLANTER

FIELD OF THE INVENTION

This invention relates to a large capacity tractor drawn and supportable sugar cane planter of a width to simultaneously plant five rows of billets and with the planter including a billet supply bin of considerably more than conventional billet capacity, all of which enables more acreage of land to be planted during a relatively small time window.

DESCRIPTION OF RELATED ART

Various different forms of planters and other structures utilize some of the general, structural and operational features of the instant invention. These previously known forms of devices are disclosed in U.S. Pat. Nos. 1,726,139, 4,314,514, 4,530,239, 4,653,411, 4,696,241 and 4,841,883. However, these previously known devices do not include the overall structural and operational features of the instant invention which result in an apparatus which may be utilized to plant five rows simultaneously and over a large acreage area without frequent need for replenishment of the sugar cane billets to be planted.

SUMMARY OF THE INVENTION

The sugar cane billet planter of the instant invention may be supported from the lift hitch mechanism of a large tractor and transported over the ground without any portion of the planter in contact with the ground. However, the planter is of sufficient width to enable five rows of sugar cane billets to be planted simultaneously and has a large capacity (approximately 10,000 pound) bin thereon for receiving a large quantity of sugar cane billets to be planted.

The extreme width of the planter and the large capacity of the bin, especially when the bin is filled with sugar cane billets to be planted, represents a considerable amount of weight which normally would be too great to be supported from the lift hitch of a large tractor. However, the large capacity bin of the planter is mounted on the planter frame for fore and aft shifting thereon in a manner such that the bin may be forwardly displaced when being carried by the lift hitch mechanism of a supporting tractor. This enables the weight of the large bin and the sugar cane billets disposed therein to be placed as closely forward as possible on the planter so that the latter may be supported from the lift hitch mechanism of a tractor.

However, when the planter is in operation and moving over the ground to be planted, the sugar cane billet containing bin thereof is displace rearwardly relative to the frame of the planter in order to enable five workmen to be seated on seats provided therefore across the width of the forward portion of the planter in position to receive individual billets from the bin for planting operations.

The planter, of course, includes furrow opening means disposed forward of the workmen seats, chutes immediately rearward of the workmen' seats for properly downwardly directing the billets into the associated furrows and furrow closing means disposed closely rearward of the chutes for closing the furrows over the planted billets, the furrow closing means being in turn followed by pressure wheels.

The main object of this invention is to provide a cane billet planter which will be capable of planting more acreage in a relatively short period of time.

Another object of this invention is to provide a cane billet planter which will be capable of planting more acreage independent of frequent replenishment of the supply of cane billets in the supply bin thereof.

Still another important object of this invention is to provide a cane billet planter which, even when the large capacity cane billet supply bin thereof is partially full of cane billets, may be lifted from the ground for transport by the lift hitch of an attendant tractor.

A further object of this invention is to provide a cane billet planter having a supply bin thereon for cane billets to be planted and wherein individual workmen may receive can billets for planting from the cane billet bin in a substantially fully controlled manner without the use of conveyor structure.

A final object of this invention to be specifically enumerated herein is to provide a cane billet planter in accordance with the proceeding objects and which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENT

Figure 1:
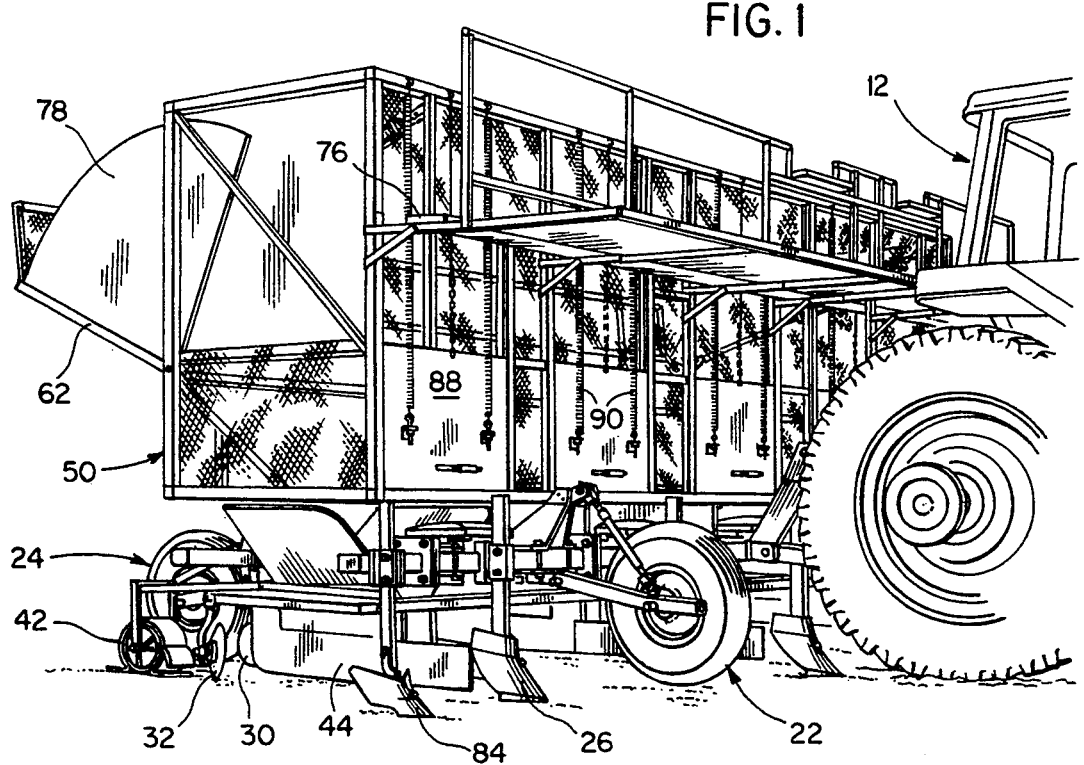
FIG. 1 is a front right side perspective view of the planter of the instant invention in operative association with a heavy duty tractor.
Figure 2:
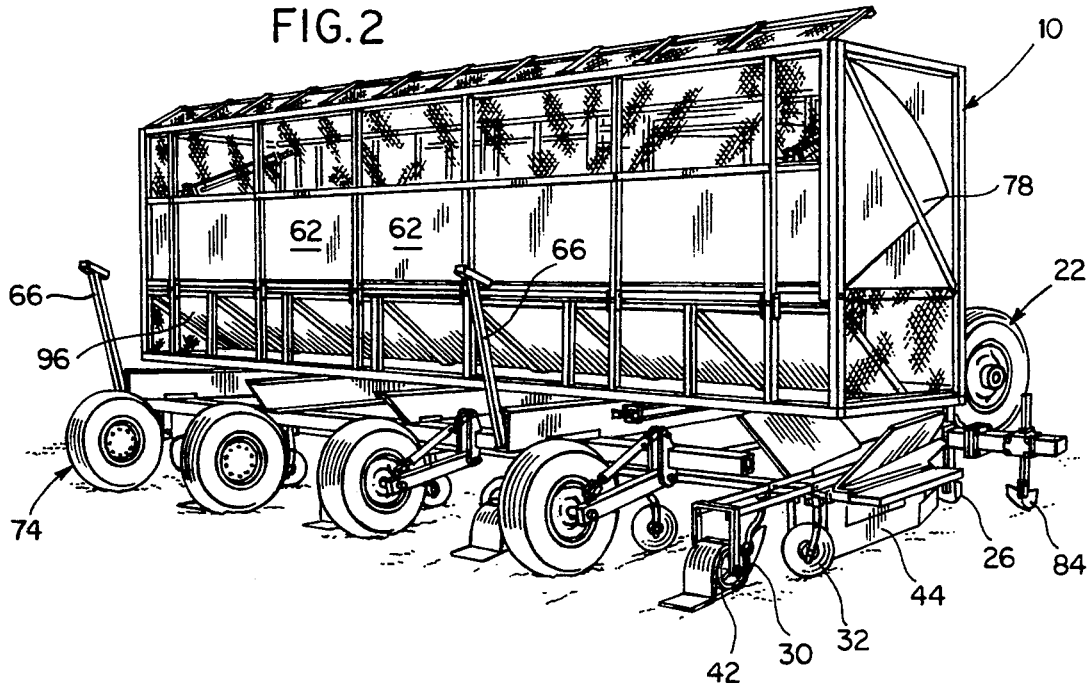
FIG. 2 is a right rear perspective view of the planter.
Figure 3:
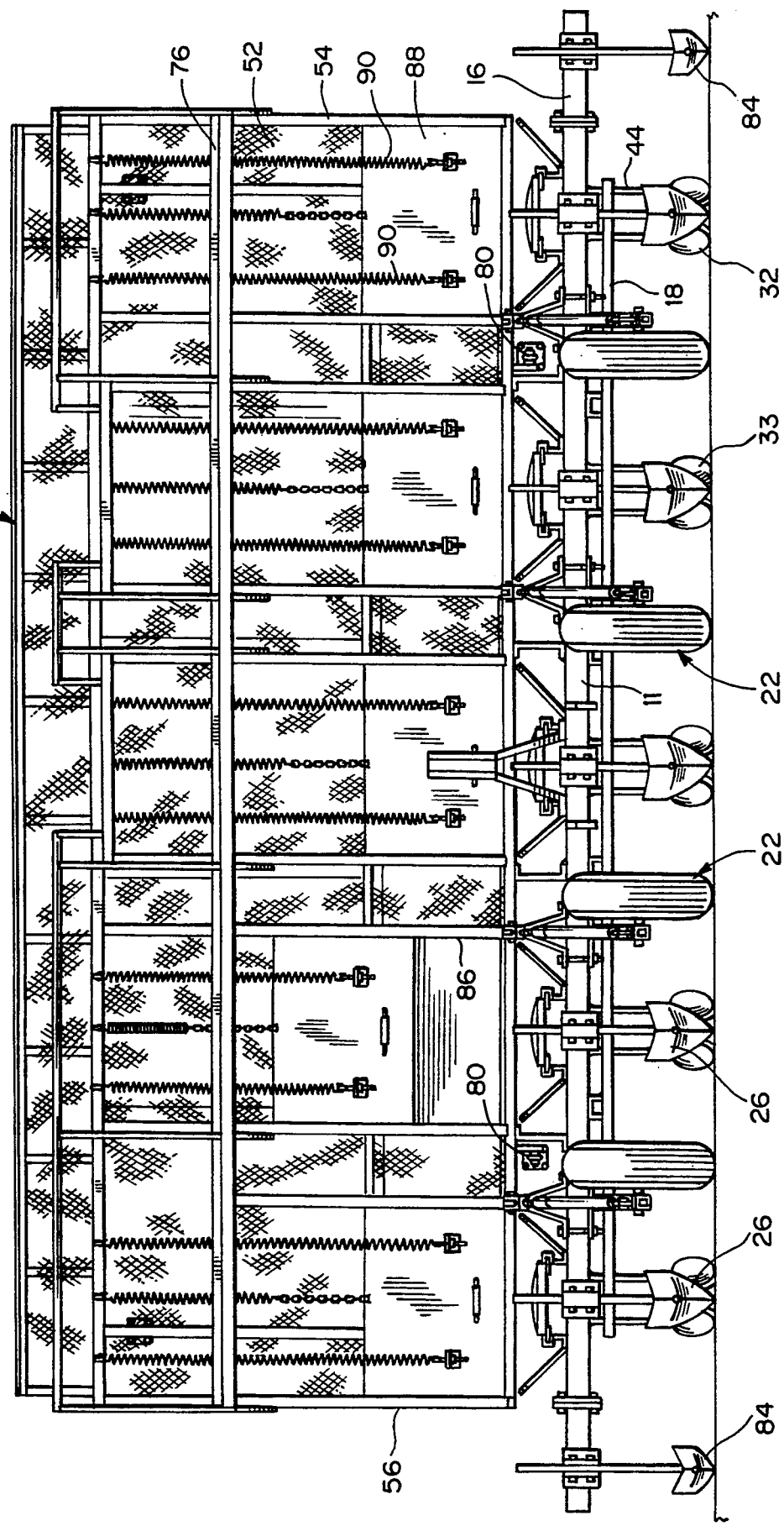
FIG. 3 is a front elevational view of the planter.

Referring now more specifically to the drawings the numeral 10 generally designates the planter or planter implement of the instant invention which is supported and trailed behind a heavy duty farm tractor 12 provided with a rear implement lift mechanism/hitch 14 from which the planter 10 is removably supported.

The planter 10 incorporates a frame 11 including front and rear frame portions 16 and 18 as well as transversely spaced front-to-rear extending beams 20 spanning between and supported from the front and rear frame portions 16 and 18.

The planter 10 is constructed of a width to simultaneously plant five rows of cane billets and the frame 20 includes front and rear adjustable height gauge wheel assemblies 22 and 24 also, the front frame portion 16 supports five vertically adjustable shovels or furrow openers 26 therefrom and a subframe 28 is provided beneath the front and rear frame members 16 and 18 and supports furrow closing disks 32,30 and between row sweeps 33 therefrom, the sweeps forming shallow furrows for the gauge assemblies 24. In addition, the subframe 28 pivotally supports trailing arms 40 therefrom whose rear ends journal pressure rollers 42 in front-to-rear alignment with corresponding disks 30,32.

In addition, the subframe 28 supports a plurality of downwardly tapering chute constructions 44 intermediate the furrow openers 26 and the furrow closing disks 32 and 30 in a manner such that there are five sets of front-to-rear aligned furrow openers 26 chute constructions 44 closure disks 32 and 30 and pressure rollers 42 spaced transversely of the planter 10. Still further, the planter 10 also includes five seats 46 supported from the front frame portion 16 slightly forward of and in front-to-rear alignment with the five chute constructions 44, each seat 46 being adapted to support a rearward facing work person 48.

The beams 20 support a large capacity (approximately 10,000 pounds) bin referred to in general by the reference numeral 50 for receiving sugar cane billets therein. The bin 50 includes a front wall 52, opposite end walls 54 and 56 and a rear wall 58 including a stationary rear portion 60 and a vertically swingable upper portion 62.

Figure 4:
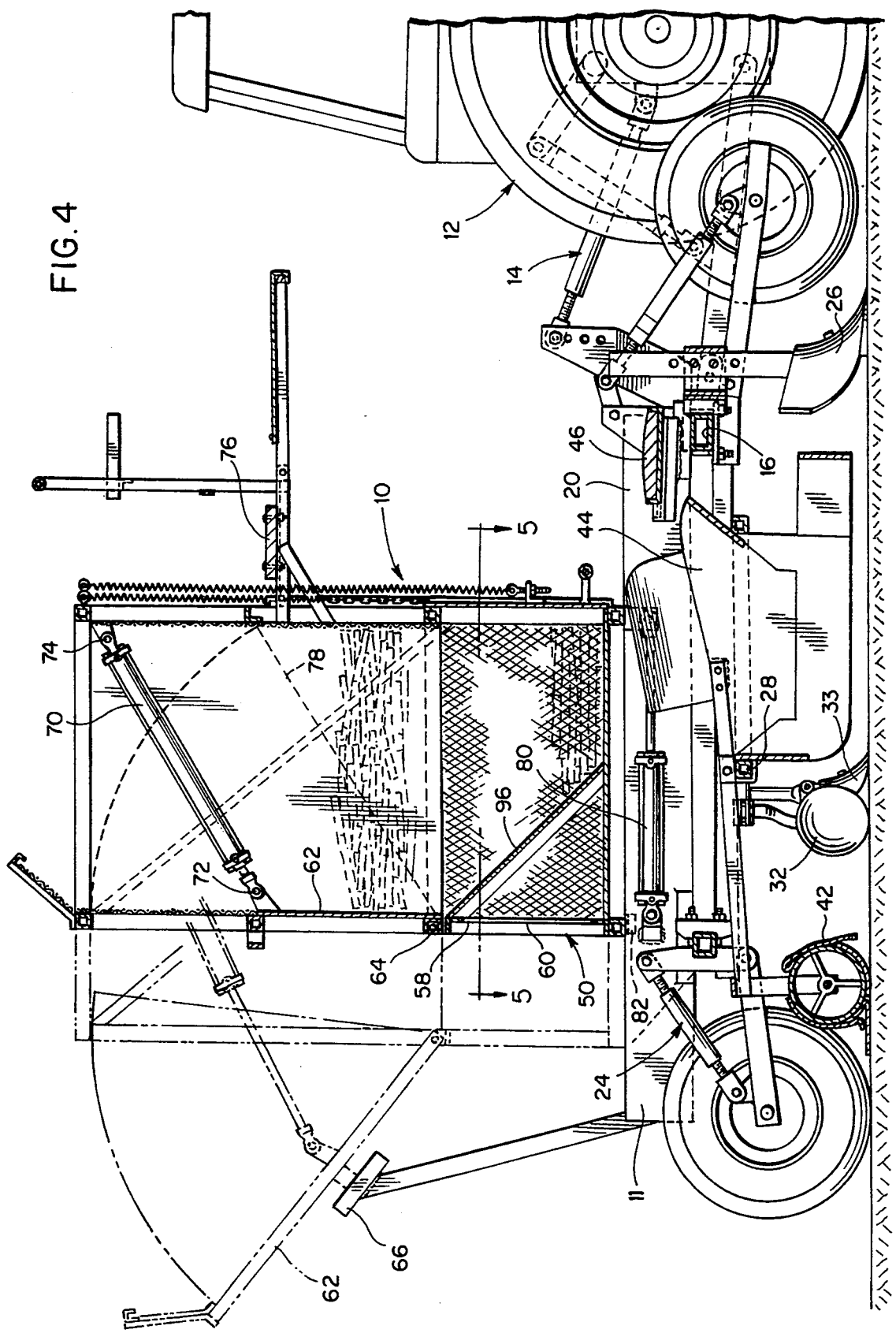
FIG. 4 is an enlarged longitudinal vertical sectional of the planter taken substantially upon a plane disposed intermediate the opposite transverse ends of the planter.
Figure 5:
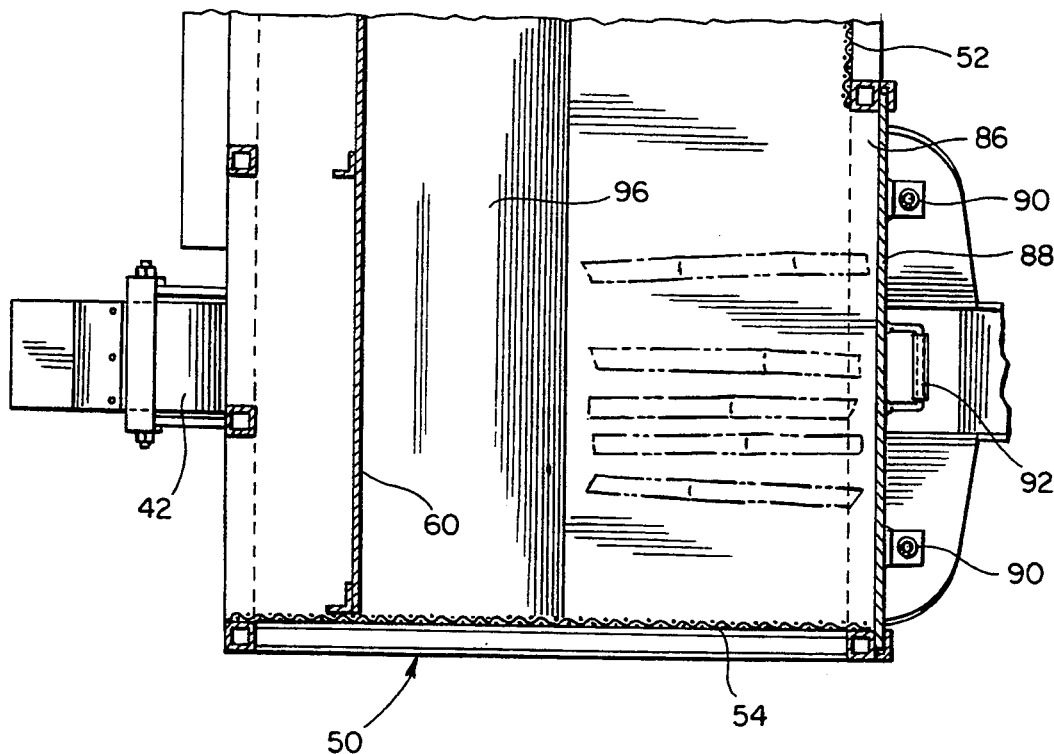
FIG. 5 is an enlarged horizontal sectional view taken substantially upon the plane indicated by the section line 5—5 of FIG. 4.
Figure 6:
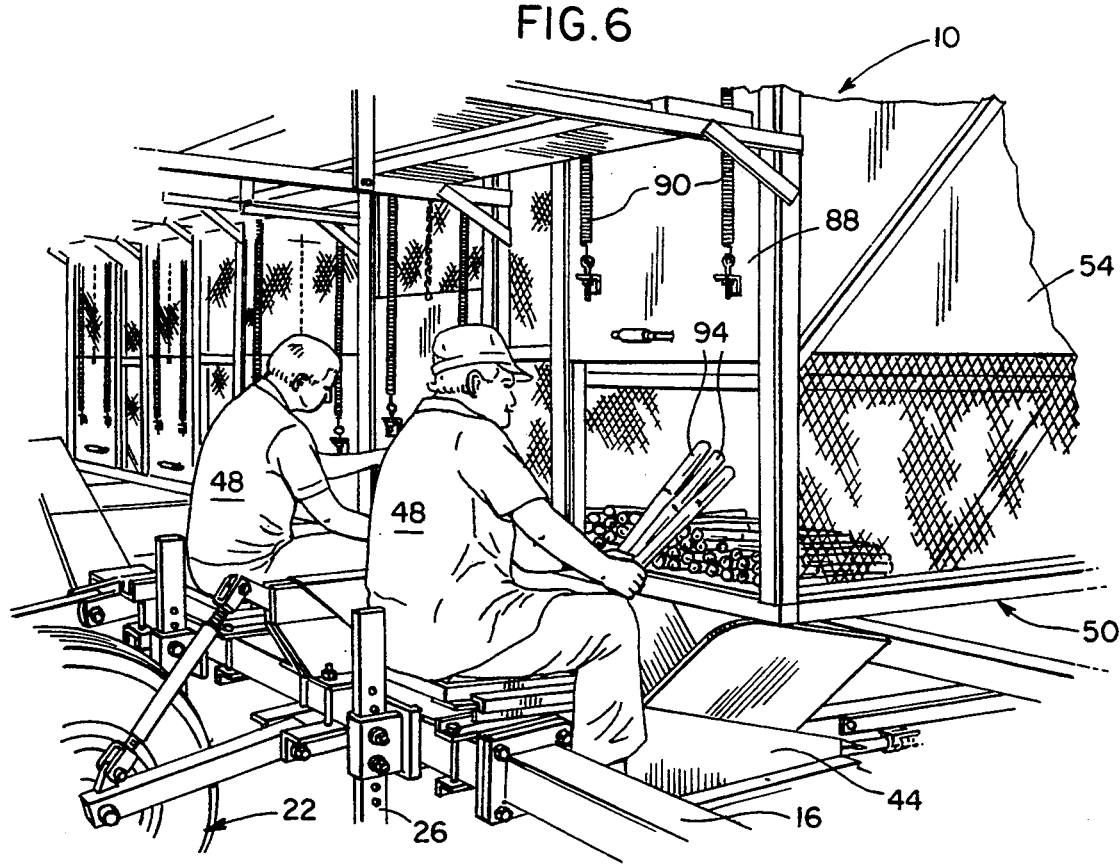
FIG. 6 is a fragmentary right rear perspective view of the planter illustrating the manner in which workers may receive cane billets from the billet supply bin and subsequently drop the billets down into chutes whose lower ends run through the furrows opened by the furrow openers of the planter for proper lengthwise positioning of the billets in the furrow before the latter are closed over the planted billets.

The rear wall upper portion 62 is pivotally supported from the upper margin of the lower portion 60 of the rear wall 58 as at 64 and may be swung from the vertical position thereof illustrated in solid lines in FIG. 4 and the rearwardly and upwardly inclined position illustrated in phantom lines in FIG. 4 resting upon upright supports 66 therefore supported from the beams 20. The rear wall upper portion 62 being remotely operable for swinging through an arc of approximately 45° through the utilization of fluid cylinders 70 interconnected between opposite ends of the rear wall upper portion 62 as at 72 and the forward upper corners of the bin 50 as at 74, the operation of the cylinders 70 being under the control of a work person (not shown) manipulating suitable controls, (not shown). Such a work person is positioned and moveable along a cat walk 76 supported and projecting forwardly from an upper portion of the front wall 52. In addition, the rear wall upper portion 62 includes end wall panels or wings 78 integral therewith which are received and swingable closely inward of the end walls 54 and 56.

Also, the bin 50 is slidably supported from the beams 20 for front-to-rear shifting between a forwardly displaced position thereof such as that illustrated in solid lines in FIG. 4 and a rearwardly displaced position thereof such as that illustrated in phantom lines in FIG. 4, although the front and rear shifting of the bin 50 could be appreciably increased. The bin 50 is remotely shiftable between the forward and rearward limit positions thereof through the utilization of fluid cylinders 80 and locked against lateral or upward shifting relative to the beams 20 through the utilization of anchoring flanges 82.

The extreme opposite ends of the front frame portion 16 include depending marking shovels 84 supported therefrom. These shovels form shallow water furrows which the shovels 84 may be registered during the next adjacent pass of the planter 10.

The front wall 52 includes five vertically elongated openings 86 therein in front-to-rear registry with the seats 46 and each opening is equipped with a vertically slidable door 88 counterbalanced through the utilization of a pair of vertical expansion springs 90. Also, the lower portion of each door 88 includes a handle 92 which may be grasped by the associated work person in order to adjust the height of the lower marginal portion of the door 88 and thus the effective cross sectional area of the opening 86 through which billets 94 may pass to the work persons 48.

In operation, the planter, which is considerably heavy due to its extreme width and having a small supply of cane billets therein is impossible to be carried behind the tractor 12 in a lifted position if the bin 50 is disposed in a rearmost position. However, when the bin 50 is forwardly displaced to its forwardmost position the cantilever weight of the planter 10 supported from the lift mechanism 14 is sufficiently reduced to enable the lift mechanism 14 and the tractor to carry the planter 10 in an elevated position. Then, when it is desired to commence planting operations, the lift mechanism 14 lowers the planter 10 to the ground (assuming proper adjustment of the wheel assemblies 22 and 24), the bin 50 is shifted to its rearmost position, work persons 48 are seated on the seats 46 and the doors 88 are slightly raised in order to have ready access to the lower forwardmost cane billets within the bin 50.

The rear lower portion of the bin 50 is provided with a forwardly and downwardly inclined floor portion 96 to insure that a remaining small quantity of cane billets 94 within the bin 50 are forwardly displaced to position at ready access to the work persons 48 through the openings 86.

When the bin 50 is to be loaded with billets, the rear wall upper portion 62 is swung rearwardly to the phantom line position thereof illustrated in FIG. 4 and the entire bin 50 including the rearwardly and upwardly inclined upper portion 62 of the rear wall is loaded with cane billets. Then, as the supply of billets within the bin 50 diminishes, the cylinders 70 may be actuated to swing the upper portion 62 of the rear wall forwardly to the upright position thereof illustrated in solid lines in FIG. 4.

The doors 88 are substantially fully counterbalanced by the expansion springs 90 and the load side pressure of the cane billets within the bin pressing forwardly on the doors 88 serve to maintain them in adjusted vertically shifted positions as desired by the work persons 48.

During the planting operation, each work person 48 receives a cane billet 94 from the bin 50 through the associated opening 86 and drops the billet 94 down through the chute construction 44, which chute construction 44 automatically longitudinally aligns the cane billet with the longitudinal furrow in which it is to be received. Successive cane billets are dropped through the chute construction 44 by a work person 48 such that the cane billets are placed within the associated furrow in substantially adjacent end aligned positions. Of course, the furrow is then closed by the corresponding disk 32,30 and the soil is pressed downward by the corresponding pressure roller 42.

It is to be noted that the cane billets represent seed material to be planted and that it would be possible to adapt the planter for use in connection with other types of seed material.

The foregoing is considered as illustrative only of the principles of the invention. Further, since numerous modifications and changes readily will occur to those skilled in the art, it is not desired to limit the invention to the exact construction and operation shown and described, and, accordingly, all suitable modifications and equivalents may be resorted to, falling within the scope of the invention.

What is claimed as new is as follows:

1. A transversely elongated planter, a tractor provided with a rear implement lift mechanism, said planter including front and rear frame portions, said front frame portion including means releasably supported from said lift mechanism for cantilever support of said planter from the rear of said tractor when said lift mechanism is actuated to lift said planter, a large volume seed material bin carried by said frame for front to rear shifting thereon between transport and planting positions, respectively, and means operative to selectively shift said bin between said transport and planting positions.

2. The planter of claim 1 wherein said frame includes a plurality of gauge wheels mounted from said rear frame portion at points spaced longitudinally thereon operative to support a portion of the weight of said planter from the rear thereof during a planting operation.

3. The planter of claim 2 wherein said gauge wheels are mounted from said rear frame portion for height adjustment relative thereto.

4. The planter of claim 1 wherein said front frame portion includes a plurality of gauge wheels mounted therefrom at points spaced longitudinally therealong operative to support a portion of the weight of said planter from the front frame portion during a planting operation.

5. The planter of claim 2 wherein said gauge wheels mounted from said front frame portion are mounted therefrom for height adjustment relative thereto.

6. The planter of claim 1 wherein said bin includes opposite ends and an elongated transverse rear wall extending between said ends, said rear wall including an upper portion thereof having a lower marginal edge pivotally mounted from said bin for swinging between a generally upright position closing the upper rear portion of said bin and a rearwardly and upwardly inclined loading position.

7. The planter of claim 6 wherein said rear wall upper portion includes forwardly directed wings received closely inward of the opposite ends of said bin when said rear wall upper portion is in either of said upright and inclined loading positions.

8. The planter of claim 1 wherein said front frame portion includes a plurality of downwardly tapering open bottom troughs spaced therealong and furrow opening means spaced forward of each of said troughs in front-to-rear alignment therewith.

9. The planter of claim 8 wherein said rear frame portion includes furrow closing means spaced rearward of each of said troughs in front-to-rear alignment therewith.

10. A transversely elongated planter including a frame for support from and transport behind a tractor provided with a rear lift mechanism, said planter including front and rear frame portions, said front frame portion including means for releasable attachment to said lift mechanism, a large volume seed material bin carried by said frame for front to rear shifting thereon between transport and planting positions, respectively, and means operative to selectively shift said bin between said transport and planting positions, said forward portion of said frame including workers seat spaced therealong forward of said bin when the latter is in said planting position.

11. The planter of claim 10 wherein said bin includes a forward upright wall rearward of said worker seats, said wall having an access opening therein in front-to-rear registry with each of said seats through which workers seated on said seats may gain access to seed material within said bin.

12. The planter of claim 11 wherein each of said access openings includes a variably closeable sliding door operatively associated therewith.

13. The planter of claim 12 wherein each of said doors comprises a vertically slidable door which opens upwardly from a lower margin of the corresponding access opening.

14. The planter of claim 13 including means substantially counterbalancing said doors from said bin.

15. A transversely elongated planter including a frame for support from and transport behind a tractor provided with a rear lift mechanism, said planter including front and rear frame portions, said front frame portion including hitch means for releasable attachment to said lift mechanism, a large volume seed material bin carried by said frame, said bin including an elongated transverse rear wall, said rear wall including an upper portion thereof having a lower marginal edge pivotally mounted from said bin for swinging between a generally upright position closing the upper rear portion of said bin and a rearwardly and upwardly inclined loading position, said bin including a rear lower portion below said rear wall upper portion including a forwardly and downwardly inclined floor portion, said forward portion of said frame including worker seats spaced therealong forward of said bin, said bin including a forward upright wall rearward of said worker seats, said forward upright wall having an access opening therein in front-to-rear registry with each of said seats through which workers seated on said seats may gain access to seed material within said bin.

16. The planter of claim 15 wherein the opposite ends of said rear wall upper portion includes forwardly directed wings received closely inward of the opposite ends of said bin when said rear wall upper portion is in either of said upright and inclined loading positions.

17. The planter of claim 15 wherein said front frame portion includes a plurality of downwardly tapering open bottom troughs spaced therealong and furrow opening means spaced forward of each of said troughs in front-to-rear alignment therewith.

18. The planter of claim 17 wherein said rear frame portion includes furrow closing means spaced rearward of each of said troughs in front-to-rear alignment therewith.

19. The planter of claim 15 wherein said access openings includes a variable closeable sliding door operatively associated therewith and each of said doors comprises a vertically slidable door which opens upwardly from a lower margin of the corresponding opening.

* * * * *